US010028192B2

(12) United States Patent
Chen et al.

(10) Patent No.: US 10,028,192 B2
(45) Date of Patent: Jul. 17, 2018

(54) ACCESS POINT SELECTION

(71) Applicant: International Business Machines Corporation, Armonk, NY (US)

(72) Inventors: Hsiang-Wen Chen, Keelung (TW); Hsiao-Yung Chen, New Taipei (TW); Wen-Ping Chi, New Taipei (TW); Hsin Yu Hsieh, Taipei (TW); Wendy Ping Wen Wang, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/899,099

(22) Filed: Feb. 19, 2018

(65) Prior Publication Data
US 2018/0152873 A1 May 31, 2018

Related U.S. Application Data

(63) Continuation of application No. 15/839,989, filed on Dec. 13, 2017, which is a continuation of application
(Continued)

(51) Int. Cl.
*H04W 36/18* (2009.01)
*H04W 36/08* (2009.01)
(Continued)

(52) U.S. Cl.
CPC ....... *H04W 36/18* (2013.01); *H04W 36/0005* (2013.01); *H04W 36/08* (2013.01); *H04W 88/08* (2013.01)

(58) Field of Classification Search
CPC . H04W 36/0005; H04W 36/08; H04W 36/18; H04W 88/08; H04B 7/0608;
(Continued)

(56) References Cited

U.S. PATENT DOCUMENTS 7,965,686 B1    6/2011  Bridge
8,654,741 B2    2/2014  Lundsgaard
(Continued)

FOREIGN PATENT DOCUMENTS

EP    2635073 A1    9/2013
WO    2009115991 A1    9/2009
(Continued)

OTHER PUBLICATIONS

Ernst et al., "A utility based access point selection method for IEEE 802.11 wireless networks with enhanced quality of experience", Jun. 10-14, 2014, 3 pages, <http://ieeexplore.ieee.org/xpl/articleDetails.jsp?tp=&arnumber=6883676&url=http%3A%2F%2Fieeexplore.ieee.org%2Fxpls%2Fabs_all.jsp%3Farnumber%3DARR2676>.
(Continued)

*Primary Examiner* — Benjamin H Elliott, IV
(74) *Attorney, Agent, or Firm* — Michael Purdham

(57) ABSTRACT

Disclosed aspects relate to access point selection. A set of beacon frame transmission data for a set of access points may be collected by a computing device. The computing device may use the set of beacon frame transmission data for the set of access points to determine to establish a connection utilizing a first access point of the set of access points. The computing device may establish the connection utilizing the first access point.

1 Claim, 6 Drawing Sheets

Related U.S. Application Data

No. 15/283,012, filed on Sep. 30, 2016, now Pat. No. 9,894,580.

(51) Int. Cl.
*H04W 36/00* (2009.01)
*H04W 88/08* (2009.01)

(58) Field of Classification Search
CPC .... H04B 7/0617; H04B 7/086; H04B 7/0862; H04B 7/088; H04B 7/0897
See application file for complete search history.

(56) References Cited

U.S. PATENT DOCUMENTS

| | | | | |
|---|---|---|---|---|
| 9,894,580 | B1* | 2/2018 | Chen | H04W 36/18 |
| 2005/0030922 | A1 | 2/2005 | Lee | |
| 2006/0164290 | A1 | 7/2006 | Dawson | |
| 2008/0102852 | A1* | 5/2008 | Du | H04W 48/20 455/453 |
| 2008/0175166 | A1 | 7/2008 | Oerton | |
| 2013/0142124 | A1* | 6/2013 | Abraham | H04W 28/06 370/328 |
| 2014/0341043 | A1 | 11/2014 | Prydekker | |
| 2015/0131483 | A1 | 5/2015 | Colban | |
| 2015/0215862 | A1* | 7/2015 | Seok | H04W 48/20 370/230 |
| 2015/0237572 | A1* | 8/2015 | Kim | H04W 48/20 370/329 |
| 2015/0271077 | A1 | 9/2015 | Mustajarvi | |
| 2015/0304929 | A1 | 10/2015 | Hua | |
| 2016/0066227 | A1 | 3/2016 | Townend | |
| 2016/0088567 | A1* | 3/2016 | Homchaudhuri | H04W 52/0274 370/252 |
| 2016/0127007 | A1* | 5/2016 | Wang | H04B 7/061 455/78 |
| 2016/0183181 | A1 | 6/2016 | Lee | |
| 2016/0205076 | A1 | 7/2016 | Shimizu | |
| 2016/0278007 | A1 | 9/2016 | Gokhale | |
| 2016/0353382 | A1 | 12/2016 | Xue | |
| 2017/0142649 | A1 | 5/2017 | El-Moussa | |
| 2017/0181073 | A1 | 6/2017 | Mohamed | |
| 2017/0262911 | A1* | 9/2017 | Jagannath | G06Q 30/0601 |

FOREIGN PATENT DOCUMENTS

| | | |
|---|---|---|
| WO | 2013036906 A1 | 3/2013 |
| WO | 2015150717 A1 | 10/2015 |
| WO | 2015198014 A1 | 12/2015 |

OTHER PUBLICATIONS

Nicholson et al., "Improved Access Point Selection", MobiSys '06, Jun. 19-22, 2006, Uppsala, Sweden, pp. 233-245, <https://web.eecs.umich.edu/~bnoble/UM_EECS/Current_Research_files/p233-nicholson.pdf>.

Vasudevan et al., "Facilitating Access Point Selection in IEEE 802.11 Wireless Networks", Internet Measurement Conference 2005, pp. 293-298, <https://www.usenix.org/legacy/event/imc05/tech/full_papers/vasudevan/vasudevan.pdf>.

"Part 11: Wireless LAN Medium Access Control (MAC) and Physical Layer (PHY) Specifications", IEEE Standard for Information technology—Telecommunications and information exchange between systems local and metropolitan area networks—Specific Requirements, IEEE Std. 802.11, Mar. 29, 2012, pp. 419 & 438.

Chen et al., "Access Point Selection", U.S. Appl. No. 15/283,012, filed Sep. 30, 2016.

Chen et al., "Access Point Selection", U.S. Appl. No. 15/839,989, filed Dec. 13, 2017.

IBM List of Patents or Patent Applications Treated as Related. Filed Feb. 19, 2018. 2 pages.

* cited by examiner

600

Access Point Status:
Max Bandwidth: 200MB
Device Count: 100

Access Point Status:
Max Bandwidth: 100MB
Device Count: 10

620

610

Available Bandwidth:
(100MB/10)*80% = 8 MB

Available Bandwidth:
(200MB/100)*70% = 1.4 MB

630

ACCESS POINT SELECTION

BACKGROUND

This disclosure relates generally to computer systems and, more particularly, relates to management of access point selection. Computing devices may make use of access points to connect to wireless networks. The number of wireless networks available for use by computing devices is increasing. As the number of available wireless networks increases, the need for management of access point selection may also increase.

SUMMARY

Aspects of the disclosure relate to management of access point selection for computing devices. Access points may be selected for computing devices to facilitate data communication between computing devices and wireless networks. Information regarding the beacon frames, maximum bandwidth, and number of connected devices for one or more access point may be collected. The collected information may be used to determine the quality (e.g., frame success rate, network speed, available bandwidth) of the network experience offered by the available access points. Indicators of network quality may be stored in a contention-free parameter field and provided to computing devices. Based on the determined quality of the available access points, one or more access points may be selected to establish a connection with a computing device. Leveraging beacon frame data and other information may facilitate data communication between computing devices and access points.

Disclosed aspects relate to access point selection. A set of beacon frame transmission data for a set of access points may be collected by a computing device. The computing device may use the set of beacon frame transmission data for the set of access points to determine to establish a connection utilizing a first access point of the set of access points. The computing device may establish the connection utilizing the first access point.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
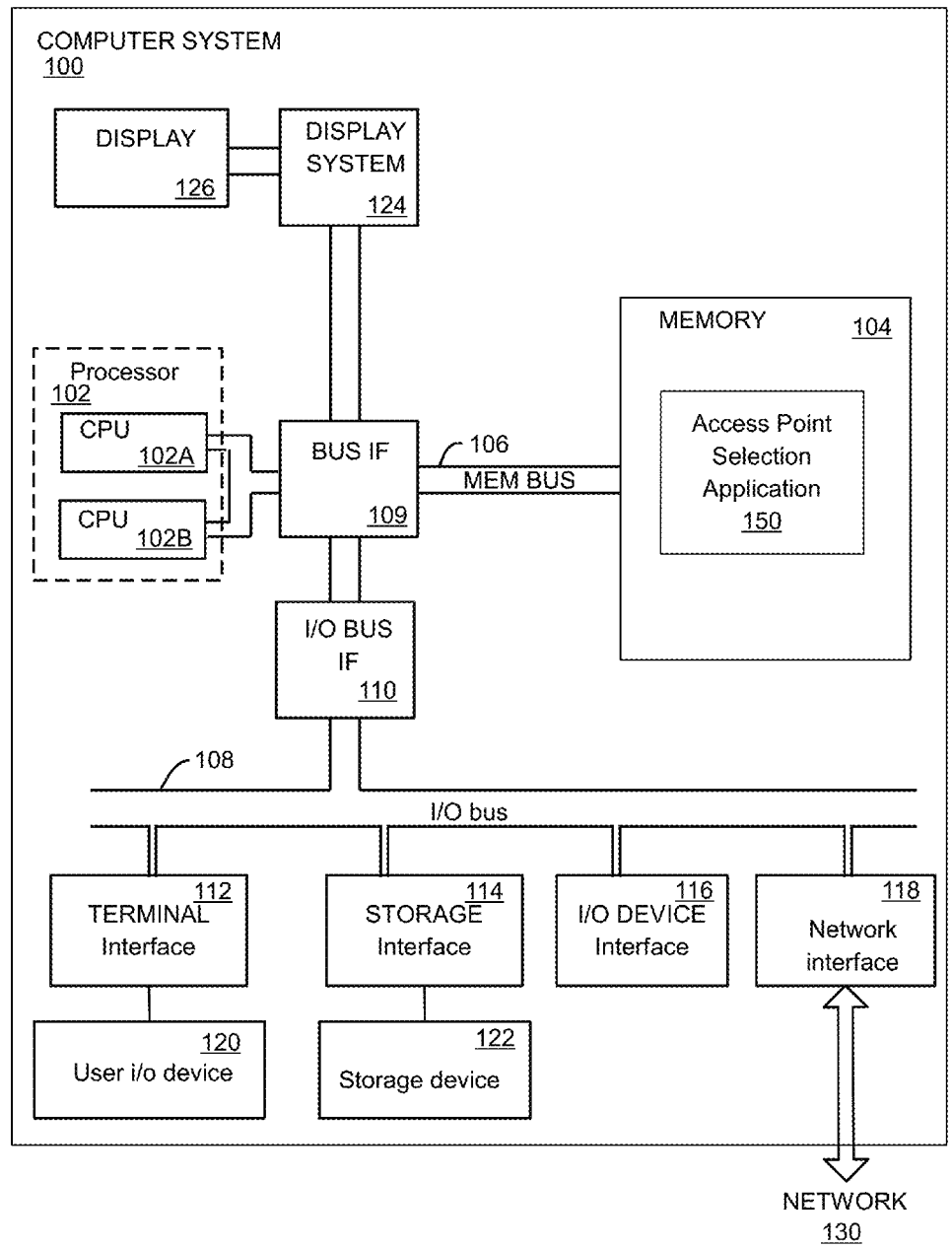
FIG. 1 depicts a high-level block diagram of a computer system for implementing various embodiments of the present disclosure, according to embodiments.

Aspects of the disclosure relate to management of access point selection for computing devices. Access points may be selected for computing devices to facilitate data communication between computing devices and wireless networks. Information regarding the beacon frames, maximum bandwidth, and number of connected devices for one or more access point may be collected. The collected information may be used to determine the quality (e.g., frame success rate, network speed, available bandwidth) of the network experience offered by the available access points. Indicators of network quality may be stored in a contention-free parameter field and provided to computing devices. Based on the determined quality of the available access points, one or more access points may be selected to establish a connection with a computing device. Leveraging beacon frame data and other information may facilitate data communication between computing devices and access points.

Connecting to wireless access points is one common method of facilitating network communication. In some environments, multiple wireless access points may be available for connection and use by computing devices (e.g., smart phones, tablets, laptop computers). Aspects of the disclosure relate to the recognition that, in situations with multiple available wireless access points, the access points with the strongest signal are often prioritized, resulting in network congestion as a large number of devices crowd onto particular access points. Accordingly, aspects of the disclosure relate to making use of beacon frame data transmitted by access points to evaluate the frame success rate (e.g., ratio of beacon frames successfully reaching computing devices), available network bandwidth, number of connected devices, and other information to determine the access point that is associated with the highest network quality for a computing device. In this way, selection of access points associated with speed, responsiveness, security, flexibility, and reliability may be facilitated.

Aspects of the disclosure include a system, method, and computer program product for management of access point selection. Aspects of the disclosure relate to collecting a set of beacon frame transmission data for a set of access points. The set of beacon frame transmission data may be collected by a computing device. In embodiments, the computing device may include a mobile computing device which initiates the access point selection in response to a triggering event. In embodiments, the computing device may include an access point controller to manage network traffic with respect to the set of access points. In embodiments, a first subset of the set of beacon frame transmission data for the first access point of the set of access points may indicate a first frame rate for the first access point. In embodiments, the computing device may evaluate a first subset of the set of beacon frame transmission data for the first access point of the set of access points with respect to a second subset of the set of beacon frame transmission data for a second access point of the set of access points. Based on the evaluating, it may be determined to establish the connection utilizing the first access point of the set of access points. In embodiments, a second subset of the set of beacon frame transmission data for a second access point of the set of access points may indicate a second frame rate for the second access point. A first factor derived utilizing the first frame rate for the first access point and a second factor derived utilizing the second frame rate for the second access point may be compared. Based on the comparing of the first and second factors, it may be determined to establish the connection utilizing the first access point of the set of access points.

In embodiments, the computing device may monitor for a set of beacon frames from the set of access points. The computing device may detect a first set of beacon frames for the first access point and detect a second set of beacon frames for a second access point. The computing device may collect a first subset of the set of beacon frame transmission data for the first access point and a second subset of the set of beacon frame transmission data for the second access point. In embodiments, a first frame success rate for the first access point may be calculated using the first subset of the set of beacon frame transmission data, and a second frame success rate for the second access point may be calculated using the second subset of the set of beacon frame transmission data. Using the frame success rate for the first access point and a first set of other information for the first access point a first connection score may be resolved. Using the frame success rate for the second access point and a second set of other information for the second access point, a second connection score may be resolved. Based on the first and second connection scores, the first access point of the set of access points may be selected. In embodiments, the first set of other information may include a first set of bandwidth information for the first access point and a first device count for the first access point, and the second set of other information may include a second set of bandwidth information for the second access point and a second device count for the second access point. In embodiments, the first set of other information may include a first distance between the computing device and the first access point, and the second set of other information may include a second distance between the computing device and the second access point. Instead of or in addition to distance, other information can include aspects related to a nature environment (e.g., weather such as thunder or heavy rain), an indoor environment (e.g., a wall, a physical obstacle), or human activity (e.g., a radio signal, physical movements). Various possibilities, combinations, and permutations are considered.

Aspects of the disclosure relate to determining, by the computing device using the set of beacon frame transmission data for the set of access points, to establish a connection utilizing a first access point of the set of access points. In embodiments, the set of beacon frame transmission data for the set of access points may be analyzed in advance of establishing the connection. In embodiments, determining to establish a connection utilizing the first access point of the set of access points may include weighting the set of beacon frame transmission data for the set of access points with respect to a set of other information for the set of access points. Using the weighting, the first access point of the set of access points may be selected. In embodiments, determining to establish a connection utilizing a first access point of the set of access points may include computing, by the computing device using the set of beacon frame transmission data for the set of access points, a set of expected network quality scores for the set of access points. Based on the set of expected quality scores for the set of access points, the first access point of the set of access points may be selected.

Aspects of the disclosure relate to establishing, by the computing device, the connection utilizing the first access point. In embodiments, the set of access points may include a set of wireless local area networks (WLANs) based on the Institute of Electrical and Electronics Engineers (IEEE) 802.11 standards, and a set of access point status information may be stored in a Contention Free (CF) Parameter Set. In embodiments, the access point selection may be used in a stadium environment. Altogether, aspects of the disclosure can have performance or efficiency benefits (e.g., data communication reliability, speed, flexibility, responsiveness, stability, high availability, productivity). Aspects may save resources such as network bandwidth, time, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store an access point selection application 150. In embodiments, the access point selection application 150 may include instructions or statements that execute on the processor 102 or instructions or statements that are interpreted by instructions or statements that execute on the processor 102 to carry out the functions as further described below. In certain embodiments, the access point selection application 150 is implemented in hardware via semiconductor devices, chips, logical gates, circuits, circuit cards, and/or other physical hardware devices in lieu of, or in addition to, a processor-based system. In embodiments, the access point selection application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1B illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
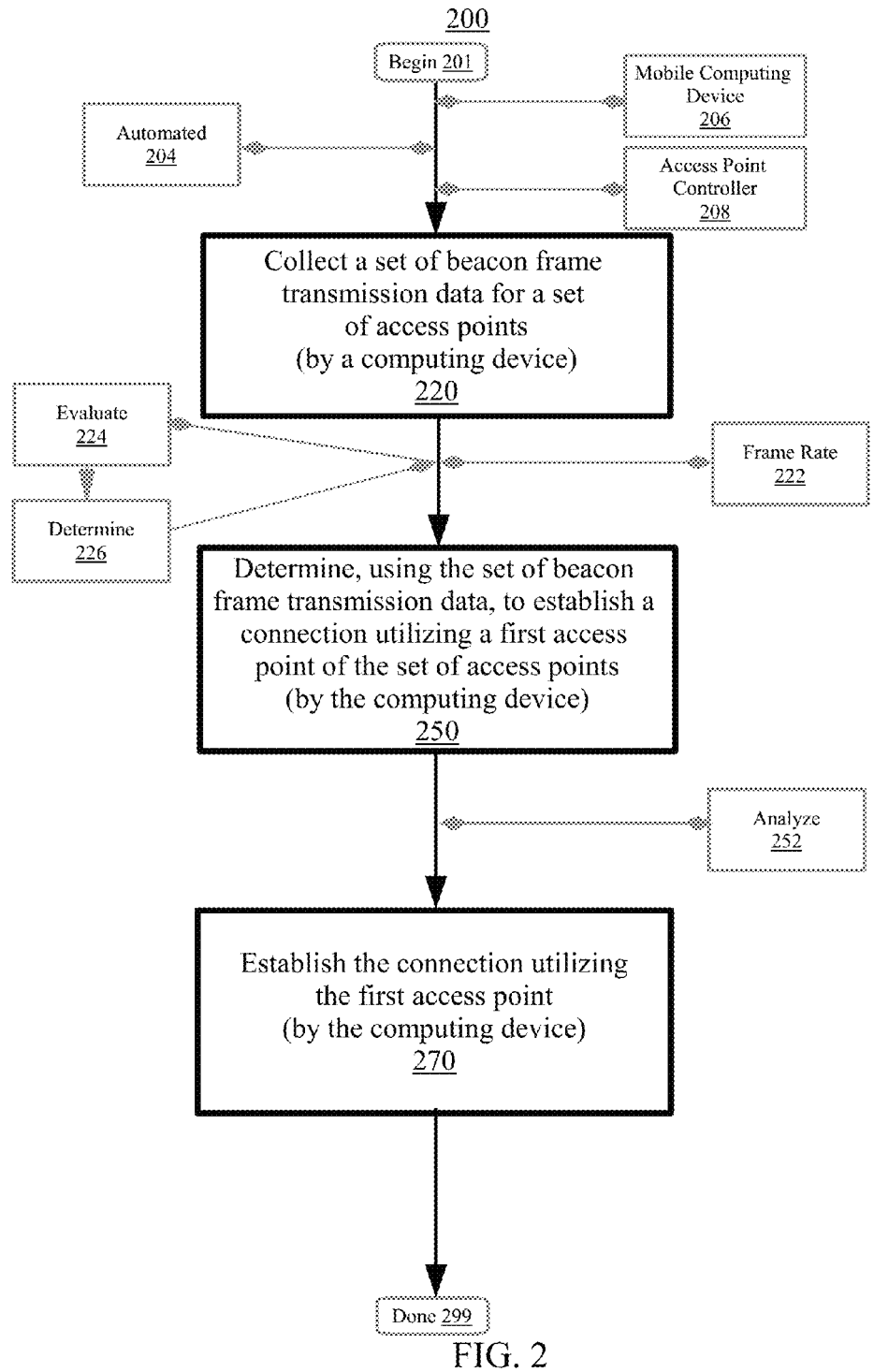
FIG. 2 is a flowchart illustrating a method for access point selection, according to embodiments.

FIG. 2 is a flowchart illustrating a method 200 for access point selection, according to embodiments. Aspects of FIG. 2 relate to using a set of beacon frame transmission data for a set of access points to facilitate data communication between an access point and a computing device. Generally, an access point may include a networking hardware device that allows a computing device to connect to a network. The computing device may include mobile devices such as smartphones, tablets, smartwatches, laptop computers, stationary devices such as desktop computers, or servers, or other hardware devices that include network functionality. For instance, a smartphone connecting to a wireless network in a coffee shop may be one example of a connection between an access point and a computing device. The method 200 may include a collecting block 220, a determining block 250, an establishing block 270, and a number of other blocks for implementing aspects of access point selection management. The method 200 may begin at block 201. Leveraging beacon frame data and other access point information may facilitate data communication between computing devices and access points.

In embodiments, the collecting, the determining, the establishing, and other steps described herein may each occur in an automated fashion without user intervention at block 204. In embodiments, the collecting, the determining, the establishing, and other steps described herein may be carried out by an internal access point management module maintained in a persistent storage device of a computing device (e.g., computing device connecting to an access point). In certain embodiments, the collecting, the determining, the establishing, and other steps described herein may be carried out by an external access point management module hosted by a remote computing device (e.g., centralized access point management system) or server (e.g., accessible via a subscription, usage-based, or other service model). In this way, aspects of access point selection management may be performed using automated computing machinery without manual action. Other methods of performing the steps described herein are also possible.

In embodiments, the computing device may include a mobile computing device at block 206. The mobile computing device may initiate access point selection in response to a triggering event. Generally, as described herein, the computing device may include a mobile device such as a tablet, laptop computer, smartphone, smartwatch, personal digital assistant, or the like. In embodiments, the mobile computing device may be configured to initiate access point selection in response to a triggering event. Generally, the triggering event can include a criteria, threshold, stipulation, condition, or requirement that, once achieved, causes another event (e.g., access point selection) to occur. In embodiments, the triggering event may include detection (e.g., by the computing device) of one or more available access points (e.g., in response to the access points coming into range, computing device powering on). In embodiments, the triggering event may include a detection that the data rate/bandwidth provided by a currently connected network is below a threshold level for a specified temporal period (e.g., data rate below 4 megabits per second for a 5-minute period). Other examples of the triggering event may include determination that an access point has become unresponsive, connection duration to the same access point for a particular temporal period (e.g., an hour), or an elapsed temporal period (e.g., period access point selection every 30 minutes, every hour, 3 hours). In certain embodiments, the triggering event can include when the user initially starts to choose an access point. Other types of computing device and access point selection triggering event are also possible.

In embodiments, the computing device may include an access point controller at block 208. The access point controller may be configured to manage network traffic with respect to the set of access points. Aspects of the disclosure relate to the recognition that in certain situations (e.g., environments with a large number of mobile devices and access points), it may be desirable to utilize an access point controller to manage and streamline data communication between access points and mobile devices. Generally, the access point controller may include a central computing unit configured to govern (e.g., distribute, monitor, route, redirect) connections between particular access points and mobile computing devices. Consider, for example, a hotel environment having multiple access points and a number of mobile devices. In such an environment, the computing device may function as an access point controller that maintains connections with each access point of the hotel in order to regulate which mobile devices may connect to which access points. As an example, a mobile device that attempts to connect to a first access point may be redirected to a second access point (e.g., that has a higher frame transmission success rate). Utilization of an access point controller to manage network connections between access points and mobile devices may be associated with performance and efficiency benefits including network connection quality. Other types of computing devices and access point controllers are also possible.

At block 220, a set of beacon frame transmission data for a set of access points may be collected. The set of beacon frame transmission data may be collected by a computing device. Generally, collecting can include receiving, gathering, aggregating, acquiring, obtaining, or otherwise accepting delivery of the set of beacon frame transmission data for the set of access points. In embodiments, access points may be configured to periodically (e.g., every 100 Time Units) broadcast a set of beacon frame transmission data including information about the nature of the access point. The set of beacon frame transmission data may alert computing devices as to the presence of an access point, as well as include timestamp information, network capability data (e.g., network infrastructure, encryption details, security protocols, network bandwidth), service set identification (SSID), supported rates, and other network parameters (e.g., frequency-hopping parameter set, direct-sequence parameter set, contention-free parameter set). Aspects of the disclosure relate to the recognition that, in certain embodiments, making use of the set of beacon frame transmission data may facilitate data communication between access points and computing devices. Accordingly, in embodiments, computing devices may be configured to collect the set of beacon frame transmission data for a set of access points for use in access point selection. In embodiments, collecting the set of beacon frame transmission data may include capturing and maintaining (e.g., in temporary storage) the set of beacon frame transmission data for a number of available access points. Other methods of collecting the set of beacon frame transmission data are also possible.

Consider the following example. A computing device such as a tablet may be used in a coffee shop environment having a number of available access points. As described herein, the computing device may be configured to collect a set of beacon frame transmission data for a set of access points of the coffee shop. In embodiments, the computing device may capture a first set of beacon frame transmission data for a first access point and a second set of beacon frame transmission data for a second access point. The computing device may maintain the captured beacon frame transmission data in a beacon frame management database, and record information such as the time each beacon frame was received, the beacon interval (e.g., time interval between successive beacon frames), the total number of beacon frames transmitted by a particular access point in a given time period (e.g., 600 frames in a minute), and the number of beacon frames received by the computing device. As described herein, the set of beacon frame transmission data may be used to facilitate access point selection. Other methods of collecting the set of beacon frame transmission data are also possible.

In embodiments, a first subset of the set of beacon frame transmission data for the first access point of the set of access points may indicate a first frame rate for the first access point at block 222. Aspects of the disclosure relate to the recognition that, in some situations, not all of the beacon frames transmitted by access points successfully reach receiving computing devices. For instance, distance, weather (e.g., fog, lightning, thunder, rain, sleet, snow, ice, humidity), obstacles, wireless interference, radio signals, and other factors may result in beacon frames loss such that only a portion of the originally transmitted beacon frames are received. Accordingly, in embodiments, aspects of the disclosure relate to making use of a set of beacon frame transmission data having a first frame rate (e.g., frame acceptance rate, frame loss rate) to facilitate access point selection. Generally, the first frame rate may include an indication of the ratio or proportion of beacon frames successfully received by a computing device with respect to the total number of beacon frames transmitted by an access point. In embodiments, the first frame rate may be expressed as a ratio, decimal, percentage, or the like. As an example, in a situation in which a first access point transmitted a total of 600 frames in a minute-long period (e.g., 10 frames per second) and a computing device received 450 frames, the frame rate for the first access point may be calculated to be 75%. Other methods of determining and utilization the frame rate for an access point are also possible.

In embodiments, a first subset of the set of beacon frame transmission data for a first access point may be evaluated with respect to a second subset of the set of beacon frame transmission data for a second access point at block 224.

Generally, evaluating can include examining, assessing, inspecting, appraising, or otherwise analyzing the first subset of the set of beacon frame transmission data with respect to the second subset of the set of beacon frame transmission data. Aspects of the disclosure relate to the recognition that, in certain situations, multiple access points may be available to a computing device. Accordingly, in such situations, the set of beacon frame transmission data may be used to assess the available access points and determine one or more for connection with the computing device. In embodiments, evaluating may include comparing one or more attributes or characteristics (e.g., available network bandwidth, network signal, number of connected devices, frame rate) of the first access point with corresponding characteristics of the second access point in order to determine an access point associated with positive impacts (e.g., network speed, quality) for the computing device. For instance, evaluating may include comparing the available network bandwidth of the first access point with the available network bandwidth of the second access point (e.g., as indicated by the set of beacon frame transmission data). As an example, in certain embodiments, the first access point may have an available bandwidth of 14 megabits per second, and the second access point may have an available bandwidth of 11 megabits per second. Based on the evaluating, it may be determined to establish a connection utilizing the first access point of the set of access points at block 226. In embodiments, determining may include ascertaining which of the evaluated access points will provide a superior (e.g., faster, more reliable, easier-to-use) connection for the computing device. For instance, with reference to the example above, determining may include selecting to utilize the first access point of the set of access points to establish the connection with the computing device (e.g., more available network bandwidth may be associated with faster connectivity). Other methods of evaluating the set of access points and determining an access point for connection are also possible.

At block 250, it may be determined to establish a connection utilizing a first access point of the set of access points. Determining to establish the connection utilizing the first access point may be performed by the computing device using the set of beacon frame transmission data for the set of access points. Generally, determining can include choosing, deciding, resolving, or ascertaining to establishing a connection utilizing a first access point of the set of access points. As described herein, aspects of the disclosure relate to selecting an access point for connection with a computing device based on a collected set of beacon frame transmission data for a set of access points. In embodiments, determining may include examining the set of beacon frame transmission data for a number of access points, and identifying an access point that is expected to be associated with speed, reliability, and security with respect to the computing device. In embodiments, determining may include ascertaining an access point that has a frame rate above a threshold value (e.g., 70% or more of the total number of transmitted beacon frames are successfully received by the computing device), a resultant bandwidth value above a threshold level (e.g., access point that has 10 or more megabits per second available for use by the computing device), or a number of users below a specified value (e.g., access point that has less than 30 other connected devices) as indicated by the set of beacon frame transmission data. The selected access point(s) may be ascertained for use in establishing a connection with the computing device. Other methods of determining to establish a connection with an access point using the set of beacon frame transmission data are also possible.

Consider the following example. In embodiments, determining to establish a connection with an access point using the set of beacon frame transmission data may include comparing the set of beacon frame transmission data for a set of access points with a set of network priority parameters. The set of network priority parameters may include a predetermined list of ranked characteristics that define a user's preferences with respect to access point selection. For instance, the set of network priority parameters may indicate that a user of the computing device prioritizes security over speed, reliability over bandwidth, or the like. The set of network priority parameters may be determined based on user input (e.g., defined by a user of the computing device) or automatically determined based on the needs and requirements of applications active on the computing device. Accordingly, the set of beacon frame transmission data may be evaluated using the set of network priority parameters to identify an access point that achieves the specified criterion. As an example, for a set of network priority parameters that rank security over network reliability, an access point that is associated with a high encryption level may be prioritized for connection with a computing device over an access point with higher network signal but lower encryption protocols. Other methods of determining to establish a connection with an access point using the set of beacon frame transmission data are also possible.

In embodiments, the set of beacon frame transmission data for the set of access points may be analyzed at block 252. The set of beacon frame transmission data for the set of access points may be analyzed in advance of establishing the connection. Generally, analyzing can include evaluating the content of the set of beacon frame transmission data to determine one or more properties, attributes, or characteristics (e.g., number of users, frame rate, available bandwidth) of the access point that transmitted the set of beacon frame transmission data. Analyzing can include examining (e.g., performing an inspection of the set of beacon frame transmission data), evaluating (e.g., generating an appraisal of the set of beacon frame transmission data), resolving (e.g., ascertaining an observation/conclusion/answer with respect to the set of beacon frame transmission data), parsing (e.g., deciphering structured and unstructured data constructs of the set of beacon frame transmission data), querying (e.g., asking a question regarding the set of beacon frame transmission data) or categorizing (e.g., organizing by a feature or element of the set of beacon frame transmission data). Data analysis may include a process of inspecting, cleaning, transforming, or modeling data to discover useful information, suggest conclusions, or support decisions. Data analysis can extract information/patterns from a data set and transform/translate it into an understandable structure for further use. As an example, analyzing may include utilizing the timestamps for a set of beacon frames to calculate the frame rate (e.g., beacon interval, frame acceptance rate) for a particular access point. Other methods of analyzing the set of beacon frame transmission data are also possible.

At block 270, the connection utilizing the first access point may be established. The connection using the first access point may be established by the computing device. Generally, establishing can include instantiating, authorizing, configuring, or otherwise setting up the connection between the computing device and the first access point. In embodiments, establishing the connection may include communicatively linking the computing device to the first access point. For instance, in embodiments, establishing the connection may include configuring the input and output network traffic ports and communication protocols of both the computing device and the first access point to allow for bilateral communication between the first access point and the computing device. The internet protocol (IP) address of the computing device may be registered in a list of authorized devices maintained by the first access point. In embodiments, establishing the connection may include designating the SSID corresponding to the first access point as a trusted network connection of the computing device. Other methods of establishing the connection between the first access point and the computing device are also possible.

Consider the following example. A computing device may collect a set of beacon frame transmission data for a number of available access points. As described herein, the set of beacon frame transmission data may include information regarding the beacon frame transmission frequency, beacon frame interval, number of connected devices, total/available network bandwidth, and the like. In embodiments, the computing device may be configured to holistically evaluate the set of beacon frame transmission data with respect to a set of network evaluation criteria. The set of network evaluation criteria may define specifications, requirements, standards, or normative levels for different aspects of network access points. The set of network evaluation criteria may be used to assign ratings to different aspects of the available access points. For instance, a particular access point may be assigned ratings of "average" with respect to beacon frame transmission frequency," "below average" with respect to the total number of connected devices, and "above average" with respect to available network bandwidth. In embodiments, as described herein, the computing device may leverage a set of user-defined network priority parameters to compare with the assigned ratings for each access point. Based on the comparison of the network priority parameters and the assigned ratings for the set of available access points, one or more networks may be determined for connection with the computing device. Other methods of determining and establishing the connection between the computing device and an access point are also possible.

Method 200 concludes at block 299. Aspects of method 200 may provide performance or efficiency benefits for access point selection. For example, aspects of method 200 may have positive impacts with respect to determining and establishing a connection with an access point based on a set of beacon frame transmission data. As described herein, the collecting, the determining, the establishing, and other steps described herein may each occur in an automated fashion without user intervention. Altogether, leveraging beacon frame data and other information may facilitate data communication between computing devices and access points.

Figure 3:
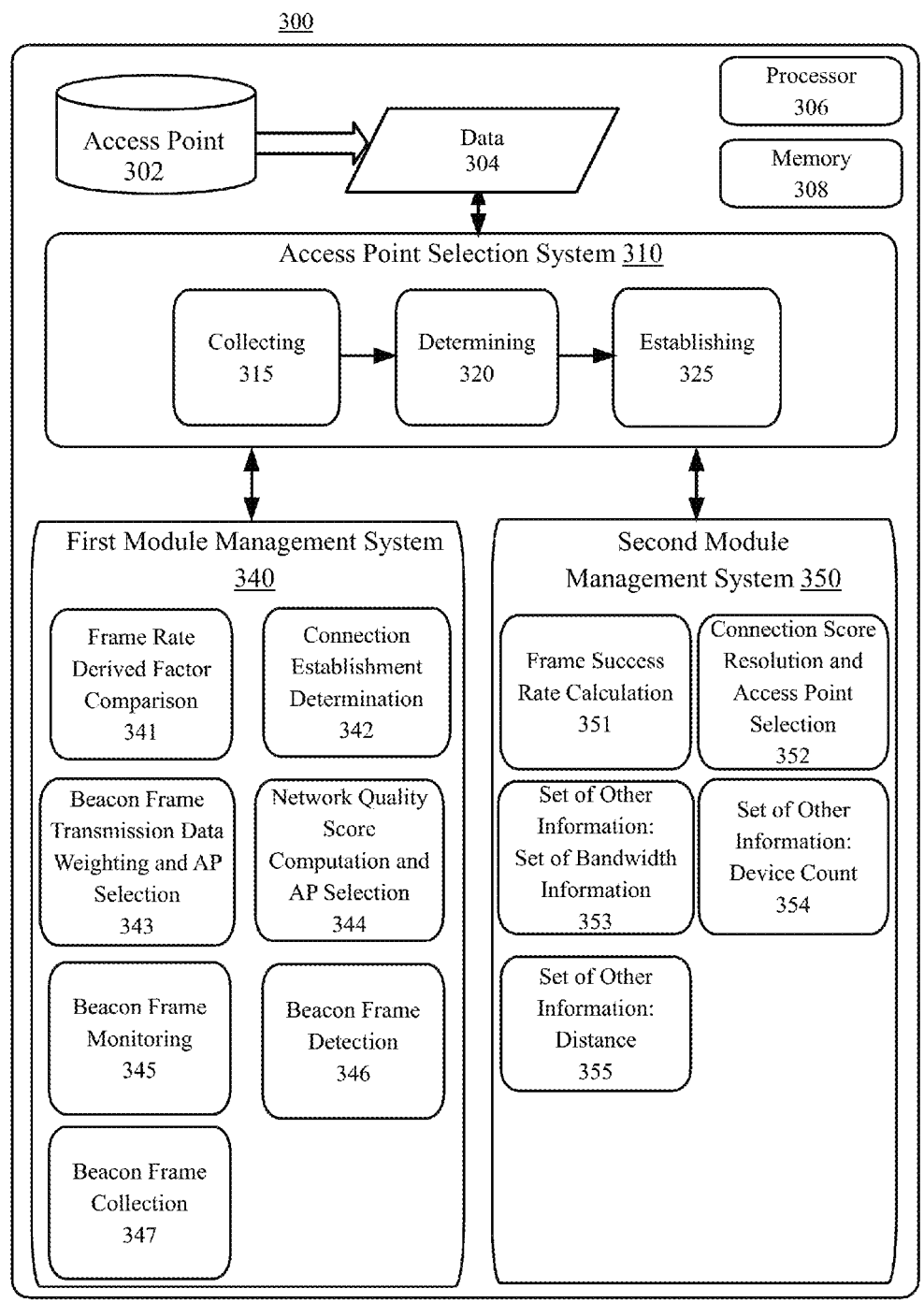
FIG. 3 shows an example system for access point selection, according to embodiments.

FIG. 3 shows an example system 300 for access point selection, according to embodiments. Aspects of FIG. 3 relate to using a set of beacon frame transmission data for a set of access points to facilitate data communication between an access point and a computing device. The example system 300 may include a processor 306 and a memory 308 to facilitate implementation of access point selection techniques. In embodiments, the example system 300 may include an access point 302. As described herein, the access point 302 may include a networking hardware device that allows a computing device to connect to a network. The example system 300 may include an access point selection system 310. The access point selection system 310 may be communicatively connected to the access point 302, and be configured to receive data 304 (e.g., a set of beacon frame transmission data) that may be used for access point selection. The access point selection system 310 may include a collecting module 315 to collect a set of beacon frame transmission data for a set of access points, a determining module 320 configured to determine to establish a connection with an access point using the set of beacon frame transmission data, and an establishing module 325 to establish the connection. In embodiments, the collecting, determining, and establishing may each be performed in a dynamic fashion (e.g., ongoing, in real-time, on-the-fly) by the access point selection system 310 to streamline access point selection. The access point selection system 310 may be communicatively connected with a first module management system 340 and a second module management system 350 that each include one or more modules for implementing aspects of access point selection management.

In embodiments, a first factor derived utilizing a first frame rate for a first access point may be compared with respect to a second factor derived utilizing a second frame rate for a second access point at module 341. Generally, comparing can include contrasting, juxtaposing, evaluating, assessing, or otherwise examining the first factor with respect to the second factor. As described herein, aspects of the disclosure relate to the recognition that the frame rate (e.g., frame loss rate, frame acceptance rate) of an access point may provide an indication of the speed, quality, reliability, or security of a particular access point. Accordingly, aspects of the disclosure relate to making use of a factor derived from the frame rate of one or more access points to determine a connection for a computing device. The frame rate derived factor may include a frame rate frequency (e.g., number of frames received in a given time period), beacon frame interval (e.g., time between consecutive frames), frame success rate (e.g., number of frames received by a device with respect to the total number of transmitted frames) signal strength factor (e.g., measure of the reception of the signal of an access point), active device count (e.g., number of devices connected to an access point), bandwidth factor (e.g., total/available network bandwidth available for devices) or other characteristic ascertained from the frame rate or set of beacon frame transmission data. In embodiments, a first factor derived from the frame rate of a first access point may be compared with a second factor derived from the frame rate of a second access point. As an example, a calculated frame success rate of 52% for a first access point may be contrasted with a calculated frame success rate of 39% for a second access point. Other methods of comparing and utilizing the frame rate derived factors are also possible.

In embodiments, it may be determined to establish a connection with an access point based on the comparing of the first and second factors at module 342. Generally, determining can include choosing, deciding, resolving, or ascertaining to establish a connection utilizing a first access point of the set of access points. As described herein, determining to establish a connection may be based on a comparison of the first and second frame rate derived factors. For instance, determining may include evaluating the results of the comparison between the first and second frame rate derived factors, and identifying an access point that is associated with positive impacts (e.g., speed, reliability, security) with respect to the computing device. For instance, with reference to the example above, in response to comparing the frame rate success rate of 52% for the first access point with the frame rate success rate of 39% for the second access point, it may be determined to utilize the first access point to establish the connection with the computing device (e.g., greater frame success rates may be associated with faster data communication). Other methods of determining to establish a connection with an access point are also possible.

In embodiments, the set of beacon frame transmission data for the set of access points may be weighted at module 343. The set of beacon frame transmission data for the set of access points may be weighted with respect to a set of other information for the set of access points. Generally, weighting can include prioritizing, emphasizing, biasing, accentuating, or otherwise assigning greater priority or preference to the set of beacon frame transmission data with respect to the set of other information. Aspects of the disclosure relate to the recognition that, in certain situations, different network characteristics may be more important or useful than others when determining an access point for connection with the computing device. Accordingly, one or more aspects of the set of beacon frame transmission data may be weighted in relation to other data (e.g., signal strength, number of users) for the access point. In embodiments, weighting may include assigning a weighting value to one or more elements of the set of beacon frame transmission data to indicate that the weighted element should be prioritized over lesser weighted elements when selecting an access point. As an example, in a situation in which a computing device requires a secure connection to transmit a sensitive file, network security and encryption level may be weighted more heavily than other aspects such as network signal strength, bandwidth, or the like. Based on the weighting, an access point of the set of access points may be selected to establish a connection with the computing device. For instance, selecting may include identifying an access point that achieves a specified threshold with respect to the weighted element (e.g., encryption above a certain level). Other methods of weighting the set of beacon frame transmission data and selecting an access point are also possible.

In embodiments, a set of expected network quality scores for the set of access points may be computed at module 344. The set of expected network quality scores may be computed by the computing device using the set of beacon frame transmission data for the set of access points. Generally, computing can include calculating, generating, formulating, or otherwise deriving the set of expected network quality scores. In embodiments, aspects of the disclosure relate to using the set of beacon frame transmission data to evaluate a set of access points and assign an expected network quality score to represent the nature of the set of access points. The expected network quality score may include a quantitative indication of the speed, reliability, security, ease of use, or overall state or condition of an access point. In embodiments, computing the set of expected network quality scores may include using a set of network evaluation criteria that define specifications, requirements, standards or normative levels for different aspects of the set of access points. The set of access points may be scored with respect to a number of different categories (e.g., frame success rate, available bandwidth, number of active devices), and the individual results may be used to compute a composite or aggregate network quality score. For instance, an access point may be evaluated using the set of network evaluation criteria, and receive individual quality scores of 73 for frame success rate, 56 for available bandwidth, and 41 for the number of active devices. The individual scores may be used to calculate a composite expected network quality score of 56.7. Based on the set of expected network quality scores for the set of access points, an access point may be selected for establishing a connection with a computing device. In embodiments, selecting the access point may include comparing the expected network quality scores for each access point of the set of access points, and identifying the access point that has an expected network quality score above a threshold level (e.g., the highest) for connection with the computing device. Other methods of calculating and using the set of expected network quality scores for the set of access points are also possible.

In embodiments, a set of beacon frames from the set of access points may be monitored at module 345. The set of beacon frames may be monitored by the computing device (e.g., using a computer-based sensor). Generally, monitoring can include scanning, observing, auditing, supervising, or surveying for the set of beacon frames. Monitoring may include querying (e.g., asking a question), searching (e.g., exploring for a reason), obtaining (e.g., recording a collection), probing (e.g., checking a property), scanning (e.g., reviewing a sample), or tracking (e.g., following a characteristic). In embodiments, monitoring may include performing a scan of available access points to ascertain whether a set of beacon frames are being transmitted. In embodiments, a set of beacon frames may be detected at module 346. Generally, detecting can include recognizing, discovering, sensing, distinguishing, or identifying the set of beacon frames. In embodiments, a first set of beacon frames may be detected for a first access point, and a second set of beacon frames may be detected for a second access point. As described herein, the first and second set of beacon frames may each include information such as the number of active devices, total/available network bandwidth, signal strength, frame rate, and other information for the corresponding access point.

In embodiments, a subset of the set of beacon frame transmission data may be collected at module 347. Generally, collecting can include receiving, gathering, aggregating, acquiring, obtaining, or otherwise accepting delivery of the subset of the set of beacon frame transmission data. In embodiments, collecting may include capturing a first subset of the set of beacon frame transmission data for the first access point and a second subset of the set of beacon frame transmission data for the second access point. Aspects of the disclosure relate to the recognition that, in some situations, not all of the beacon frames transmitted by access points successfully reach receiving computing devices (e.g., due to distance, obstacles, wireless interference). Accordingly, the number of beacon frames received from an access point may vary based on the distance between the computing device and the access point, signal strength, beacon frame transmission frequency, and other factors. In embodiments, collecting may include capturing and maintaining (e.g., in temporary storage) the subsets of beacon frame transmission data for a number of available access points (e.g., first subset for a first access point and second subset for a second access point). In embodiments, the first and second subsets of beacon frame transmission data may be collected concurrently or simultaneously. Other methods of collecting subsets of the beacon frame transmission data are also possible.

In embodiments, a frame success rate for an access point may be calculated at module 351. A first frame success rate for a first access point may be calculated using a first subset of the set of beacon frame transmission data, and a second frame success rate for a second access point may be calculated using a second subset of the set of beacon frame transmission data. Generally, calculating can include computing, formulating, resolving, or otherwise ascertaining the first frame success rate and the second frame success rate. As described herein, aspects of the disclosure relate to the recognition that different access points may be associated with different frame success rates (e.g., the rate or proportion of beacon frames that reach a computing device). Accordingly, calculating frame success rates for different access points may facilitate access point selection (e.g., connecting to access points with higher frame success rates may be associated with higher network quality). In embodiments, the frame success rate may be calculated by dividing the number of beacon frames received by a computing device by the total number of frames transmitted by the access point in the same time period. As an example, in a situation where a first access point sent out 400 frames in one-minute period and 280 were received by a computing device, a first frame success rate of 70% may be calculated for the first access point. As another example, in a situation where a second access point sent out 700 frames in a minute and 560 were received by a computing device, a second frame success rate of 80% may be calculated for the second access point. Other methods of calculating the frame success rate for an access point are also possible.

In embodiments, a connection score may be resolved for an access point using the frame success rate and a set of other information for an access point at module 352. Generally, resolving can include generating, calculating, deriving, formulating, computing, or determining the connection score based on the frame success rate and the set of other information. As described herein, aspects of the disclosure relate to the recognition that the frame success rate and other information (e.g., number of connected devices, bandwidth information, distance) may be used to determine an evaluation or assessment of an access point. In embodiments, the connection score may be an indication of the overall responsiveness, effectiveness, or usefulness of a particular access point. The connection score may be expressed as an integer (e.g., 7, 8), percentage (e.g., 91%), letter grade (e.g., A, B), star rating (e.g., 3 stars, 5 stars) or other quantitative representation of the connectivity of an access point. In embodiments, resolving may include using an algorithmic technique to incorporate the frame success rate and other information along with associated weighting values to calculate the connection score. Generally, those access points associated with high frame success rates, low latency, low number of connected devices, strong signal, and higher levels of available bandwidth may be associated with higher connection scores. Based on the set of connection scores for the set of access points, an access point may be selected for establishing a connection with a computing device. In embodiments, selecting the access point may include comparing the connection scores for each access point of the set of access points, and identifying the access point that has a connection score above a threshold level (e.g., the highest) for connection with the computing device. Other methods for resolving and using connection scores for the set of access points are also possible.

In embodiments, the set of other information may include a set of bandwidth information for an access point at module 353. The set of bandwidth information may include data regarding the total amount of bandwidth managed by an access point (e.g., 800 gigabits per second), the amount of bandwidth available for use or allocation to a computing device (e.g., 20 megabits per second), the average amount of bandwidth used by a single computing device, historical bandwidth usage data (e.g., peak usage times, low usage times), as well as other network bandwidth statistics for an access point. In embodiments, the set of other information may include a device count for an access point at module 354. The device count may include an indication of the number of other computing devices currently connected to a particular access point. The device count may indicate the average number of connected devices, device connection rate fluctuations (e.g., trending increase of 1 device every 45 minutes), or average device usage statistics (e.g., length of time devices remain connected, amount of bandwidth used by devices). In embodiments, the set of other information may include a distance at module 355. The distance may indicate the separation interval between the computing device and an access point, the range covered by the access point, the average distance between computing devices and the access point, an estimated distance, or other statistics for the access point. Other types of information may also be included in the set of other information.

Figure 4:
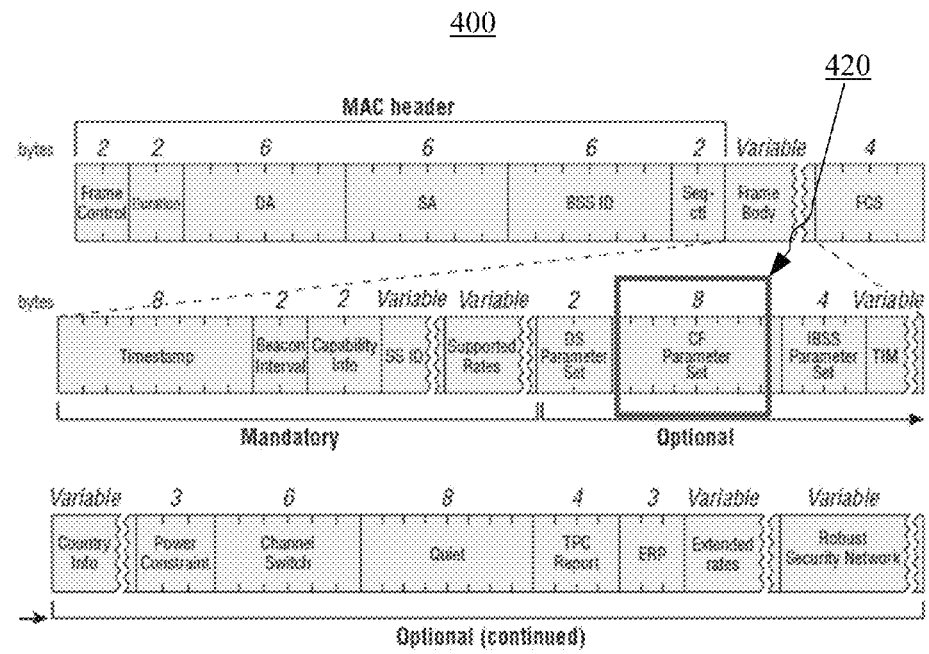
FIG. 4 shows a beacon frame structure for storage of a set of beacon frame transmission data, according to embodiments.

FIG. 4 shows a beacon frame structure 400 for storage of a set of beacon frame transmission data, according to embodiments. Aspects of FIG. 4 relate to leveraging available space of beacon frame structure for storage of data related to access point selection. In embodiments, aspects of the disclosure relate to the recognition that the beacon frame structure for beacon frames configured according to the Institute of Electrical and Electronics Engineers' (IEEE) 802.11 wireless standards may include an 8-byte long Contention-Free (CF) Parameter Set 420 that may be unoccupied by other frame data. Aspects of the disclosure, in embodiments, relate to storing a set of access point status information in the CF Parameter Set 420. The set of access point status information may include data pertaining to the bandwidth of the access point, the number of active devices supported by the access point, frame success rate, frame frequency rate, beacon interval, or other information. As an example, in certain embodiments, data that indicates the maximum bandwidth of the access point (e.g., occupying 2 bytes), the number of connected devices (e.g., occupying 1 byte), and the beacon interval of the access point (e.g., occupying 1 byte) may be stored in the CF parameter set 420. Other methods of storing the set of access point status information, as well as other types of access point status information are also possible.

Figure 5:
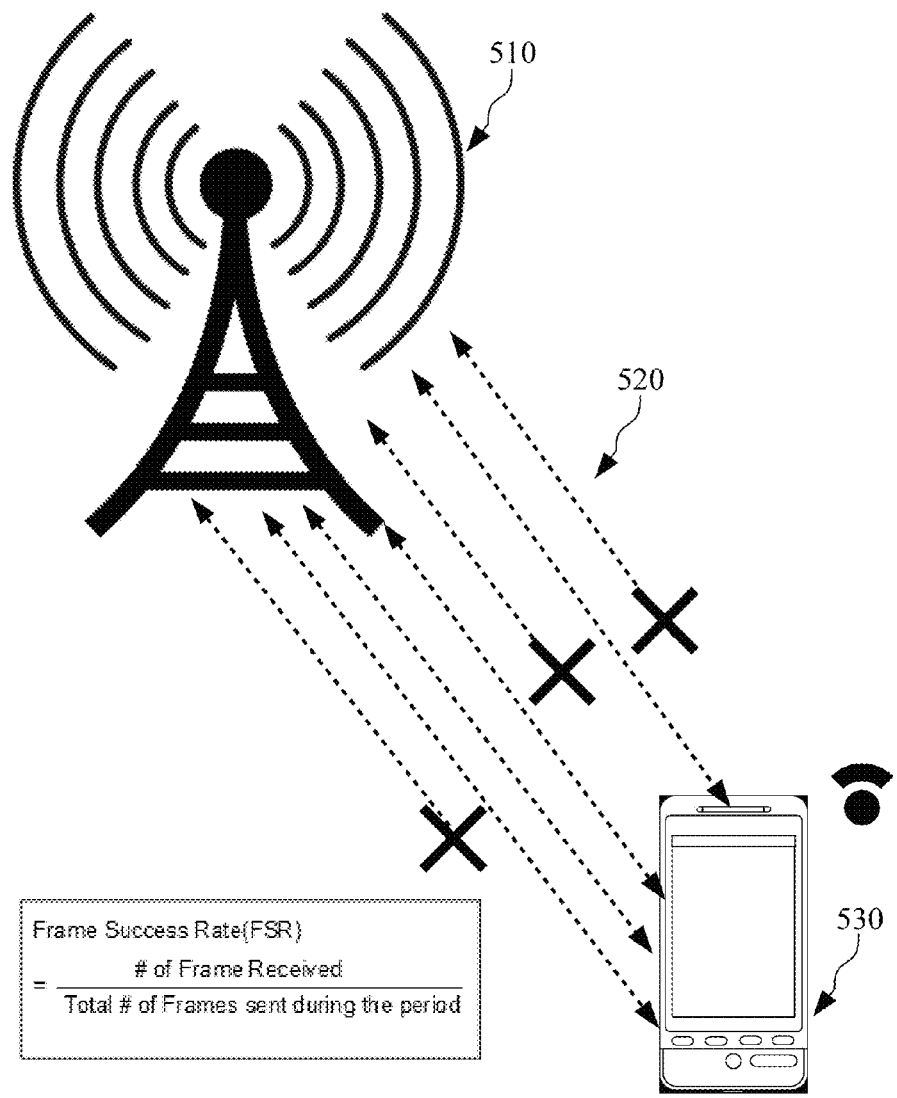
FIG. 5 shows an example environment for frame success rate calculation, according to embodiments.

FIG. 5 shows an example environment 500 for frame success rate calculation, according to embodiments. Aspects of FIG. 5 relate to using a set of beacon frames 520 to compute a frame success rate for an access point 510. As shown in FIG. 5, a computing device 530 (e.g., mobile computing device such as a smart phone, tablet, laptop computer) may discover an available access point 510. As described herein, the computing device 530 may be configured to monitor for and collect a set of beacon frames 520 that are transmitted by the access point 510. In embodiments, the computing device 530 may use the set of beacon frames 520 to compute a frame success rate for the access point. The frame success rate may include an indication of the ratio or proportion of beacon frames successfully received by the computing device 530 with respect to the total number of beacon frames transmitted by the access point 510 in a given time period. In embodiments, the frame success rate may be calculated by dividing the number of beacon frames received by the computing device 530 by the total number of frames transmitted during the same time period by the access point 510. For example, as shown in FIG. 5, the access point 510 may transmit a set of beacon frames 520 including a total of 7 frames in a given time period. Of the 7 total frames, the computing device 530 may receive 4 beacon frames (e.g., other beacon frames were lost due to interference, obstacles, distance). Accordingly, a frame success rate of 57.1% may be calculated for the access point 510. The calculated frame success rate may be used together with other information for the access point (e.g., available bandwidth, number of active devices) to facilitate access point selection for a computing device 530. Other methods of calculating the frame success rate are also possible.

Figure 6:
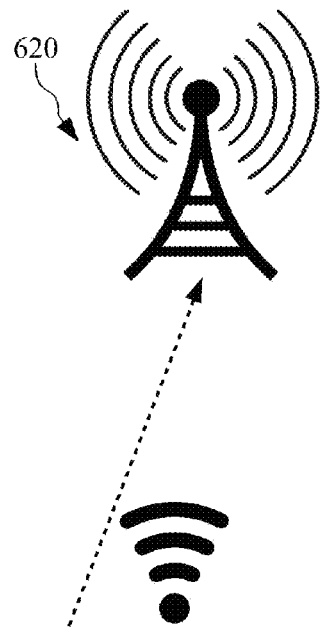
FIG. 6 shows an example environment for access point selection, according to embodiments While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.
Figure 6:
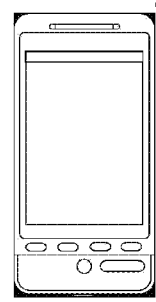

FIG. 6 shows an example environment 600 for access point selection, according to embodiments. Aspects of FIG. 6 relate to using a set of beacon frame transmission data for a set of access points to facilitate access point selection for a computing device. In embodiments, the set of beacon frame transmission data for multiple available access points may be compared to select an access point associated with speed, responsiveness, reliability or security for a computing device. As shown in FIG. 6, an example environment 600 may include a first access point 610 and a second access point 620. In embodiments, the example environment 600 may include a stadium environment. As examples, the example environment 600 may include a sporting event arena, concert venue, public park, amphitheater, or other indoor or outdoor area. In embodiments, a computing device 630 may discover the first access point 610 and the second access point 620. The computing device 630 may collect a first set of beacon frame transmission data for the first access point 610 and a second set of beacon frame transmission data for the second access point 620.

As described herein, the sets of beacon frame transmission data may include information regarding the status or characteristics of the corresponding access point. For instance, the first set of beacon frame transmission data may indicate that the first access point 610 can provide up to 100 megabits per second of bandwidth with a medium signal level, and has 10 connected devices. In embodiments, the computing device 630 may use the first set of beacon frame transmission data to calculate a frame success rate of 80% for the first access point 610. The second set of beacon frame transmission data may indicate that the second access point 620 can provide up to 200 megabits per second of bandwidth with a high signal level and 100 connected devices. The computing device 630 may use the second set of beacon frame transmission data to calculate a frame success rate of 70% for the second access point 620. In embodiments, the computing device 630 may make use of the bandwidth data, device count, and frame success rate to calculate the net amount of bandwidth available from each access point for use by the computing device 630. For instance, in embodiments, the computing device 630 may divide the total amount of bandwidth for each access point by the number of active devices, and multiply this result by the frame success rate calculated for that access point to derive the amount of available bandwidth. Accordingly, as shown in FIG. 6, the computing device 630 may compute an available bandwidth value of 8 megabits per second for the first access point 610, and an available bandwidth value of 1.4 megabits per second for the second access point 620. Accordingly, the available bandwidth values for each access point may be compared, and it may be determined that the first access point 610 is expected to be associated with greater network quality. As such, the first access point 610 may be selected to establish a connection with the computing device 630. Other methods of access point selection are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used, and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for access point selection, the method comprising:
    collecting, by a computing device, a set of beacon frame transmission data for a set of access points, wherein the set of beacon frame transmission data includes:
        a first subset of the set of beacon frame transmission data for the first access point of the set of access points, wherein the first subset of the set of beacon frame transmission data indicates a first frame success rate for the first access point,
        a second subset of the set of beacon frame transmission data for a second access point of the set of access points, wherein the second subset of the set of beacon frame transmission data indicates a second frame success rate for the second access point,
        a first number of active devices for the first access point, and
        a second number of active devices for the second access point;
    comparing a first factor derived utilizing the first frame success rate for the first access point with respect to a second factor derived utilizing the second frame success rate for the second access point;
    computing, by the computing device using both the first and second frame success rates and the first and second numbers of active devices, a set of expected network quality scores for the set of access points, wherein a lower number of active devices indicates a higher expected network quality score;
    analyzing, in advance of establishing a connection, each of: a set of frequency hopping parameters, a set of direct-sequence parameters, and a set of contention-free parameters;
    evaluating, by the computing device, a first network capability data for the first access point of the set of access points with respect to a second network capability data for the second access point of the set of access points, wherein:
        the first network capability data includes: a first network infrastructure, a first set of encryption details, and a first set of security protocols, and
        the second network capability data includes: a second network infrastructure, a second set of encryption details, and a second set of security protocols;
    weighting, by the computing device, the set of beacon frame transmission data for the set of access points with respect to a set of other information for the set of access points which indicates that network security and encryption level have heavier weights than network signal strength and bandwidth;
    identifying, by the computing device and using the weighting, that the first access point achieves a specified threshold related to encryption level;
    determining, by the computing device using the set of beacon frame transmission data for the set of access points, using a comparison of the first and second factors, and using a comparison of a first expected network quality score for the first access point and a second expected network quality score for the second access point, and based on the evaluating of the first and second network capability data, and based on the identifying and using the weighting, to establish the connection utilizing the first access point of the set of access points; and
    establishing, by the computing device, the connection utilizing the first access point.

* * * * *